(12) United States Patent
Chai et al.

(10) Patent No.: US 8,914,733 B2
(45) Date of Patent: Dec. 16, 2014

(54) USER INTERFACE WIDGET UNIT SHARING FOR APPLICATION USER INTERFACE DISTRIBUTION

(75) Inventors: Haixin Chai, Beijing (CN); Daniel Q. Chen, Chelmsford, MA (US); Rong Yao Fu, Beijing (CN); Hui Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 2635 days.

(21) Appl. No.: 11/243,424

(22) Filed: Oct. 4, 2005

(65) Prior Publication Data
US 2007/0078953 A1    Apr. 5, 2007

(51) Int. Cl.
*G06F 3/00*    (2006.01)
*G06F 9/44*    (2006.01)

(52) U.S. Cl.
CPC .................................. *G06F 9/4443* (2013.01)
USPC ........... 715/751; 715/744; 715/764; 715/788; 715/804; 709/203

(58) Field of Classification Search
USPC ......................................................... 715/751
See application file for complete search history.

(56) References Cited

U.S. PATENT DOCUMENTS

| | | | |
|---|---|---|---|
| 5,642,511 A | 6/1997 | Chow et al. | |
| 5,946,697 A | 8/1999 | Shen | |
| 6,018,343 A | 1/2000 | Wang et al. | |
| 6,161,136 A | 12/2000 | Hyndman et al. | |
| 6,330,618 B1 * | 12/2001 | Hawkins et al. | 709/248 |
| 6,615,253 B1 | 9/2003 | Bowman-Amuah | |
| 7,370,269 B1 * | 5/2008 | Prabhu et al. | 715/751 |
| 8,521,857 B2 * | 8/2013 | Maxwell et al. | 715/802 |
| 2002/0165983 A1 * | 11/2002 | Gastaldi | 709/245 |
| 2003/0088640 A1 | 5/2003 | Rasheed et al. | |
| 2003/0105644 A1 | 6/2003 | Ali et al. | |
| 2003/0187983 A1 | 10/2003 | Rajic et al. | |
| 2004/0046789 A1 * | 3/2004 | Inanoria | 345/748 |
| 2004/0168191 A1 * | 8/2004 | Jerding et al. | 725/52 |
| 2004/0205452 A1 | 10/2004 | Fitzsimons et al. | |
| 2004/0240408 A1 * | 12/2004 | Gur | 370/328 |
| 2005/0182844 A1 * | 8/2005 | Johnson et al. | 709/230 |

(Continued)

FOREIGN PATENT DOCUMENTS

| | | |
|---|---|---|
| CA | 2161837 | 5/1997 |
| JP | 2001523853 | 11/2001 |
| JP | 2003330712 | 11/2003 |

OTHER PUBLICATIONS

Anderson et al, "Chimera: Hypermedia for Heterogeneous Software Development Environments", ACM Transactions on Information Systems (TOIS), vol. 18, Issue 3 (Jul. 2000), pp. 211-245.

(Continued)

*Primary Examiner* — Dino Kujundzic
(74) *Attorney, Agent, or Firm* — Steven M. Greenberg, Esq.

(57) ABSTRACT

Embodiments of the invention address deficiencies of the art in respect to application sharing and provide a method, system and computer program product for user interface widget unit based application sharing. In a first embodiment, a data processing system for user interface widget unit based application sharing, can include a dynamic widget server communicatively linked to a dynamic widget browser. The dynamic widget browser can include program code enabled to render a user interface including one or more remote dynamic widgets peered to corresponding dynamic widgets for a dynamic view for an application launched by the dynamic widget server.

8 Claims, 3 Drawing Sheets

(56) References Cited

U.S. PATENT DOCUMENTS

| | | | |
|---|---|---|---|
| 2006/0005207 A1* | 1/2006 | Louch et al. | 719/328 |
| 2006/0036941 A1* | 2/2006 | Neil | 715/526 |
| 2006/0047665 A1* | 3/2006 | Neil | 707/10 |
| 2006/0277469 A1* | 12/2006 | Chaudhri et al. | 715/709 |
| 2007/0101291 A1* | 5/2007 | Forstall et al. | 715/805 |
| 2007/0130541 A1* | 6/2007 | Louch et al. | 715/804 |

OTHER PUBLICATIONS

Anderson et al, "Chimera: Hypertext for Heterogeneous Software Environments", Proceedings of the 1994 ACM European Conference on Hypermedia Technology, pp. 94-107.

"Method to Convert Graphical User Interface Definitions and Windows to HyperText Markup Language", IBM Technical Disclosure Bulletin, vol. 4, No. 8, Aug. 1997, pp. 167-174.

Guarracino, et al, "Yabat: An Administration and Monitoring Software for Beowulf", Proceedings of the IEEE International Conference on Cluster Computing, CLUSTER 2000, Nov. 28 to Dec. 1, 2000, pp. 401-402.

Kellog et al, "Interface Management: A CORBA Universal Service Manager", Proceedings of the IEEE Third International Workshop on Systems Management, Apr. 22-24, 1998, pp. 148-149.

"Transformation of an Entity-Relationship Model into a System Object", IBM Technical Disclosure Bulletin, vol. 37, No. 11, Nov. 1994, pp. 631-633.

* cited by examiner

USER INTERFACE WIDGET UNIT SHARING FOR APPLICATION USER INTERFACE DISTRIBUTION

BACKGROUND OF THE INVENTION

1. Field of the Invention

The present invention relates to the field of collaborative computing and more particularly to user interface sharing in a collaborative environment.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include instant messaging, Internet telephony and application sharing.

In conventional application sharing, an application host can distribute imagery of an application operating in the host to one or more application viewers distributed about the computer communications network. The imagery can include not only the screens rendered in association with the operation of the shared application, but also the visual presentation of mouse pointer movements and the like. Generally, speaking, however, the imagery can include only discrete "snap-shots" of the actual display of the operating application in the host system. In this way, the application viewers can be given the appearance of sharing an application, though each viewer merely views a shadow rendering of only a portion of the operation of the shared application.

Pixel based application sharing technology allows the capturing of a series of images which represent the display of an application. The images can be transmitted across the computer communications network, which when rendered, can provide the illusion of duplicating the display of the application in its host environment. Nevertheless, the underlying technology used to support application sharing in this manner includes substantial limitations in that an entire application user interface or complete desktop user interface must be shared. For example, pixel based solutions like virtual network computing (VNC) provide facilities to share only portions of a user interface. In VNC, the pixels of a screen region are captured and transmitted to a remote station. However, VNC provides mere coarse-grained control over the user interface to be shared, while the user interface gratuity is a screen region, which brings some substantial limitations.

More particularly, pixel-based screen sharing requires more network bandwidth, for example, the size of data representing a fifty (50) by thirty (30) button is approximately one kilobyte. Secondly, it is very hard for the pixel-based screen sharing to understand the content of the user interface to be shared to meet the requirements of advanced operations, for example, to re-arrange the layout of the user interface to be shared to fit the form factor of the remote station, or to remove some of the private information from the user interface before transmitting the information. In consequence, sharing an application in a heterogeneous environment, where the form factors of devices are diverse, network capability is widely different and people have their personal privacy concerns, becomes a great challenge for the traditional pixel-based application sharing technologies.

BRIEF SUMMARY OF THE INVENTION

Embodiments of the present invention address deficiencies of the art in respect to application sharing and provide a novel and non-obvious method, system and computer program product for user interface widget unit based application sharing. In a first embodiment, a data processing system for user interface widget unit based application sharing, can include a dynamic widget server communicatively linked to a dynamic widget browser. The dynamic widget browser can include program code enabled to render a user interface including one or more remote dynamic widgets peered to corresponding dynamic widgets for a dynamic view for an application launched by the dynamic widget server.

In another embodiment of the invention, a method for user interface widget unit based application sharing can include separating an application user interface for a shareable application into movable and non-movable graphical user interface widgets, distributing remote peer instances of the movable graphical user interface widgets to a client host for incorporation in a synchronized dynamic view for the application, and synchronizing the remote peer instances with corresponding instances of the movable graphical user interface widgets in a server host.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for user interface widget unit based application sharing. In accordance with an embodiment of the present invention, an application user interface for a shareable application can be separated into movable and non-movable graphical user interface widget units. Each movable graphical user interface widget unit can correspond to a different portion of the application where the application has been distributed across different server hosts.

The movable graphical user interface widget units can be distributed to different client hosts for incorporation in a client user interface for the application. The state of each instance of a distributed movable graphical user interface widget in different ones of the client hosts can be synchronized with the state of the application. In this way, the user interface for an application can be shared, regardless of whether the application resides in a single server host, or whether the portions of the application are distributed across different server hosts.

To facilitate user interface widget unit based application sharing, a distributed view server can provide a framework which allows a client host to discover the movable user interface widgets for an application on a server host and allows end users to operate on the movable user interface widgets for distributed rendering. Also a distributed dynamic standard widget library can be included which provides applications with standard graphic Application Programming Interface (API), but implements each API in a distributed fashion. As a result, an application built upon the library enjoys the option to show a portion or the entire user interface within a broad range of remote hosts and to receive events from the remote hosts. For example, the dynamic standard widget library can implement APIs of the standard widget toolkit (SWT) known in the art and can extend behaviors of the SWT to permit the distributed rendering of SWT widgets in remote client hosts, and the receipt of user interface events from the remote hosts for distributed SWT widgets in a server host to acquire a user's input in the user interface and to keep synchronization among the source user interface and its distributed copies.

Figure 1:
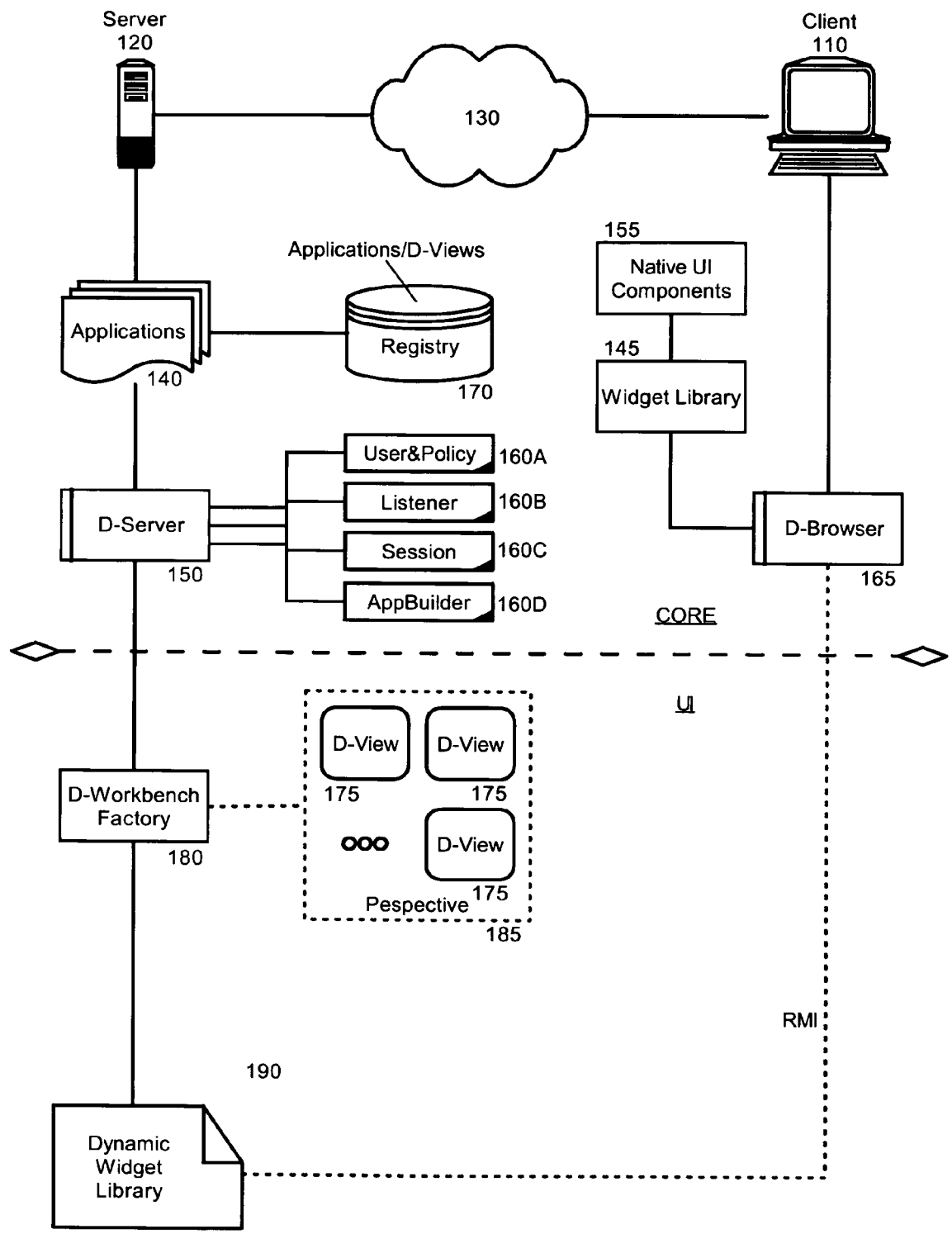
FIG. 1 is a schematic illustration of a data processing system configured for user interface widget unit based application sharing.

In further illustration, FIG. 1 is a schematic illustration of a data processing system configured for user interface widget unit based application sharing. The data processing system can include a server host 120 coupled to one or more client hosts 110 over a computer communications network 130 which can exist within one computing device or across multiple computing devices (only one client host 110 shown for simplicity of illustration). Each client host 110 can include a dynamic widget browser 165 configured to browse applications and corresponding views available for distribution to the client host 110, and to render user interface widgets within selected views for selected applications.

The server host 120 can include one or more applications 140. The applications 140 can be coupled to a registry 170 which can include a listing of applications and dynamic application views available for distribution to remote ones of the client hosts 110. The applications 140 further can be coupled to a dynamic view server 150. The dynamic view server 150 can include user and policy logic 160A, listener logic 160B, session logic 160C and application builder logic 160D. Finally, the dynamic widget server 150 can be coupled to a dynamic workbench factory 180 configured to produce one or more dynamic views 175 in a container 185 based upon one or more dynamic widgets in a dynamic widget library 190. Notably, the dynamic widget browser 165 can acquire user input over a distributed user interface and can detect any change to the distributed user interface. The user input and change events can be provided to the dynamic view server 150 for the purpose of synchronization.

In operation, applications 140 can be registered with the dynamic view server 150 specifying the identity of the application and associated dynamic views for storage in the registry 170. Once the applications 140 have been registered with the dynamic view server 150, listener logic 160B can receive requests from the client hosts 110. The requests can include discovery requests to identify available applications 140 and corresponding dynamic views, application control requests to launch or close selected ones of the applications 140, and dynamic view control requests to copy, move, multicast and broadcast a selected dynamic view to fit into a broad wide of use cases. For example, a user can broadcast a dynamic view to a group of people in the case of conference.

An end user can use the dynamic widget browser 165 to interact with the dynamic view server 150. As part of end user interactions, the dynamic view server 150 can validate requests of client hosts 110 using user and policy logic 160A. The interactions available to the end user can include browsing available applications 140 and corresponding dynamic views listed in the registry 170. The interactions further can include launching selected ones of the applications 140 and requiring that portions of the user interface for the selected ones of the applications 140 are rendered in the dynamic widget browser 165. For each one of the applications 140 launched in a dynamic widget browser 165, session management logic 160C can create a corresponding session.

Once the corresponding session has been created, the dynamic widget browser 165 can report to the dynamic view server 150 with its capability and characteristics for rendering a distributed dynamic view. The capability and characteristics can be used by the application builder logic 160D for dynamic view construction. The corresponding session further can maintain the dynamic state of the dynamic widget browser 165, for example, a list of active distributed dynamic view shown within the widget browser 165. The dynamic state can be used by the distributed view server 150 to restore content within the dynamic widget browser 165 in the case of an unexpected network exception.

Notably, for each user interface request received from a client host 110, the application builder logic 160D can create a user interface layout for the request. Specifically, the application builder logic 160D can call the dynamic workbench factory 180 to create a background container 185 for the response. The application builder logic 160D further can create one or more dynamic views 175 for the container 185. When the application builder logic 160D constructs a dynamic view 175, the application builder logic 160D can consult user and policy logic 160A to remove selected widgets that contain privacy information, for example e-mail address, and mobile phone numbers from the source view. The application builder logic 160D further can re-arrange the layout of the source view to adapt to the characteristics of the target distributed view browser 165. For example, if the size of the source view is much larger than the physical size of the window of the distributed view browser 165, the application builder logic 160D can separate the source view into several pages. Finally, the user interface layout can be transferred to the client host 110 via the dynamic widget library 190. The dynamic widget browser 165, in turn, can receive the user interface layout and can call the local widget library 145 for rendering. The local widget library 145 in turn can call native user interface API 155 to render the user interface layout in the client host 110.

Figure 2:
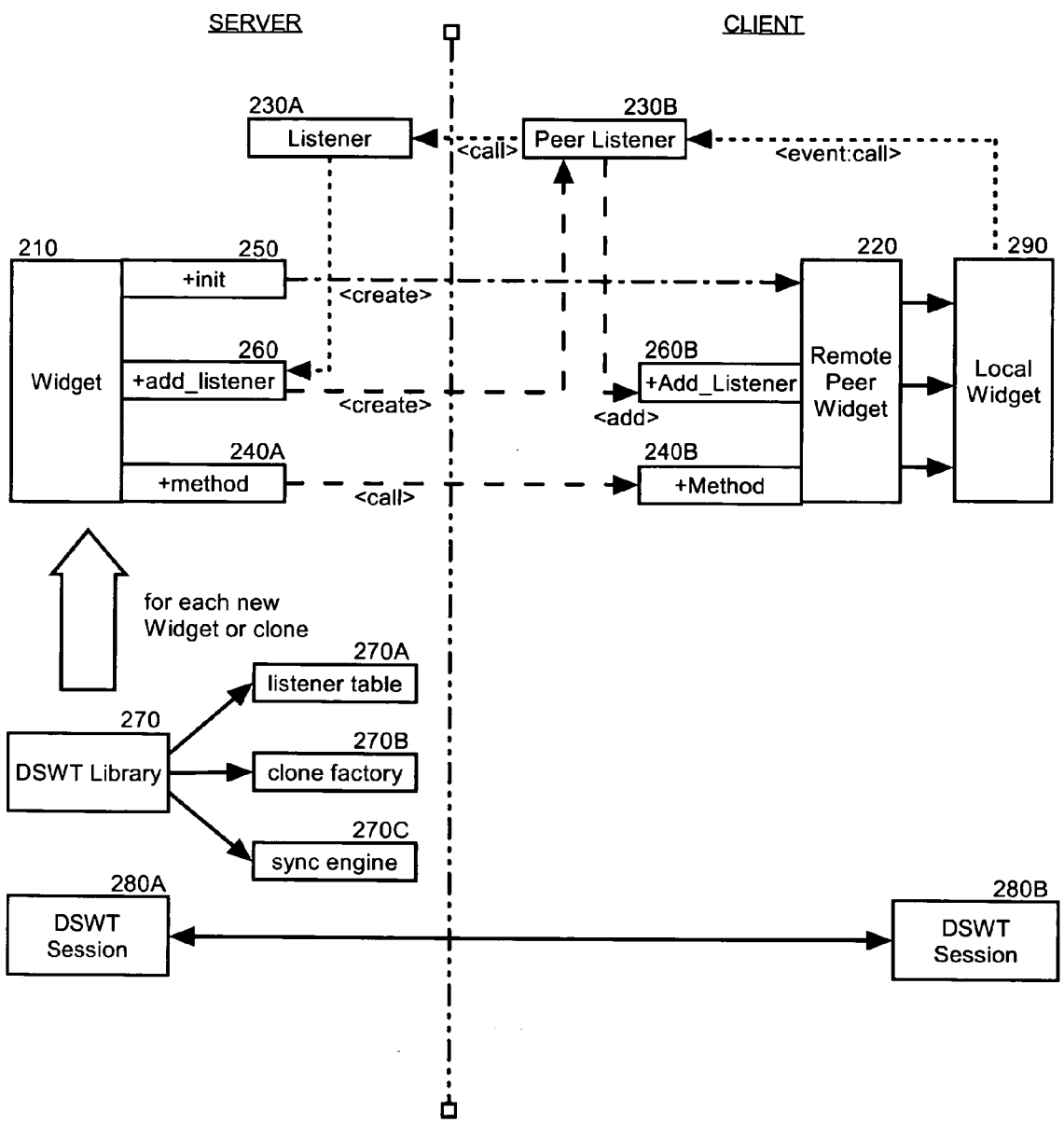
FIG. 2 is a block diagram of a distributed user interface architecture configured to support user interface widget unit based application sharing; and, FIG. 3 is an event diagram illustrating a process for user interface widget unit based application sharing in the architecture of FIG. 2.

To facilitate the distribution and synchronization of each user interface widget in a shared view, an underlying user interface toolkit can be extended to permit peering with remotely disposed and rendered widgets. For example, as shown in FIG. 2, an SWT widget 210 defined within a dynamic SWT library can be extended to include an init( . . . ) method 250 and an add_listener( . . . ) method 260. The init( . . . ) method 250 can include program code enabled to create a remote peer widget 220 coupled to a local widget 290. The init( . . . ) method 250 can called when the application attempts to create a new instance of an SWT widget 210. The init( . . . ) method 250 in response can transmit a notification to the distributed view browser that consequently creates an instance of the remote peer widget 220.

The add_listener( . . . ) method 260, in turn, can include program code enabled to create a remote peer listener 230B and add the remote peer listener 260B to the remote peer widget 220. An application can use the add_listener( . . . ) method 260 to add an event listener 230A to a widget instance 210. The add_listener( . . . ) method, in turn, can create a peer listener 230B within the distributed view browser. Next, the peer listner 230 can register itself to the remote peer widget 220 by calling the add_listener( . . . ) method 260B of the remote peer widget 220.

In operation, calls to the public methods 240A of the SWT widget 210 can be forwarded to corresponding methods 240B of the remote peer widget 220. Moreover, events occurring in the local widget 290 can be routed to the widget 210 through communications between a listener 230 for the widget 210 and the peer listener 230B. To support multiple users, a listener table 270A, clone factory 270B and synchronization engine 270C can be included in dynamic SWT library 270 used to produce SWT widgets 210. Finally, matched dynamic SWT sessions 280A, 280B can be established to facilitate communications between remote and local SWT libraries.

Figure 3:
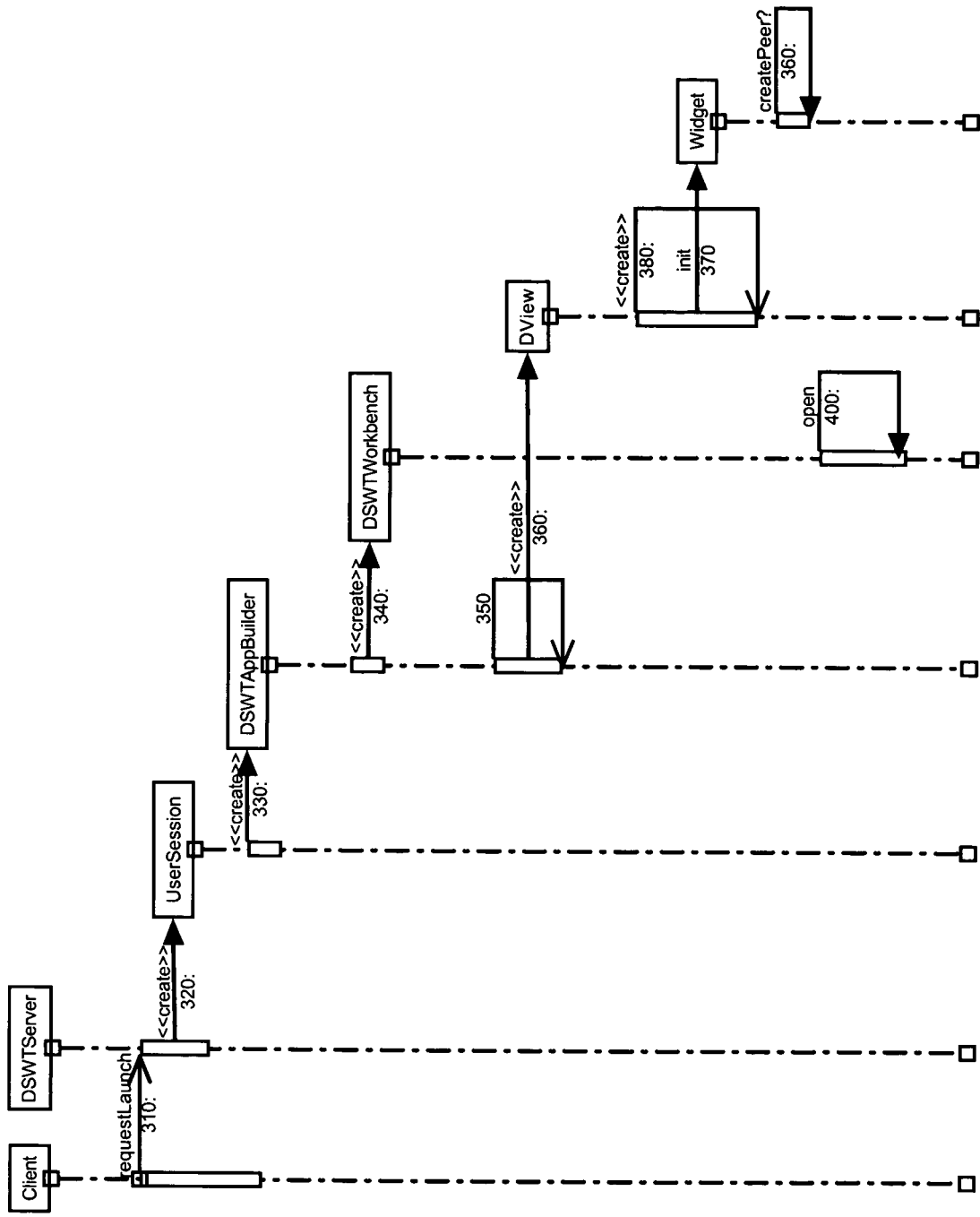

In more particular illustration, FIG. 3 is an event diagram illustrating a process for user interface widget unit based application sharing in the architecture of FIG. 2. As shown in FIG. 3, a client can forward a request 310 to the dynamic view server to launch an application. The dynamic view server, in turn, can create 320 a user session for the application. Subsequently, the created user session can forward a request 330 to create a view to the application builder. Thereafter, the application builder can create 340 a widget workbench and the application builder can repeatedly 350 create 360 one or more dynamic views. Each of the created dynamic views, in turn, can create 380 and initiate 370 local widgets, which can, in turn, create 360 remote peer widgets. Finally, the workbench can open 400 the view for even processing.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for user interface widget unit based application sharing, comprising:
   separating an application user interface for a shareable application into movable and non-movable graphical user interface widgets;
   distributing remote peer instances of said movable graphical user interface widgets to a client host for incorporation in a synchronized dynamic view for the application; and,
   synchronizing said remote peer instances with corresponding instances of said movable graphical user interface widgets in a server host.

2. The method of claim 1, further comprising:
   registering a plurality of shareable applications and corresponding views for distribution to client hosts; and,
   listening for requests to launch selected ones of said shareable applications.

3. The method of claim 1, wherein said distributing remote peer instances of said movable graphical user interface widgets to a client host for incorporation in a synchronized dynamic view for the application, comprises:
   creating said remote peer instances of said movable graphical user interface widgets in said client host; and,
   coupling a listener object to each of said remote peer instances to pass events occurring in said remote peer instances to said corresponding instances.

4. The method of claim 1, wherein said synchronizing said remote peer instances with corresponding instances of said movable graphical user interface widgets in a server host, comprises:
   listening for events received from said remote peer instances; and, forwarding method calls to said remote instances from said corresponding instances.

5. A computer program product comprising a non-transitory computer usable storage medium having computer usable program code for user interface widget unit based application sharing, said computer program product including:
   computer usable program code for separating an application user interface for a shareable application into movable and non-movable graphical user interface widgets;
   computer usable program code for distributing remote peer instances of said movable graphical user interface widgets to a client host for incorporation in a synchronized dynamic view for the application; and,
   computer usable program code for synchronizing said remote peer instances with corresponding instances of said movable graphical user interface widgets in a server host.

6. The computer program product of claim 5, further comprising:

computer usable program code for registering a plurality of shareable applications and corresponding views for distribution to client hosts; and, computer usable program code for listening for requests to launch selected ones of said shareable applications.

7. The computer program product of claim 5, wherein said computer usable program code for distributing remote peer instances of said movable graphical user interface widgets to a client host for incorporation in a synchronized dynamic view for the application, comprises:

computer usable program code for creating said remote peer instances of said movable graphical user interface widgets in said client host; and, computer usable program code for coupling a listener object to each of said remote peer instances to pass events occurring in said remote peer instances to said corresponding instances.

8. The computer program produce of claim 5, wherein said computer usable program code for synchronizing said remote peer instances with corresponding instances of said movable graphical user interface widgets in a server host, comprises:

computer usable program code for listening for events received from said remote peer instances; and, computer usable program code for forwarding method calls to said remote instances from said corresponding instances.

\* \* \* \* \*